United States Patent
Wee et al.

(10) Patent No.: US 9,560,364 B2
(45) Date of Patent: Jan. 31, 2017

(54) ENCODING IMAGE DATA WITH QUANTIZING AND INVERSE-QUANTIZING PIXEL VALUES

(71) Applicants: Fingram Co., Ltd., Suwon-si, Gyeonggi-do (KR); Quram Co., Ltd., Suwon-si, Gyeonggi-do (KR)

(72) Inventors: Young Cheul Wee, Suwon-si (KR); Young Hoon Ahn, Suwon-si (KR)

(73) Assignees: FINGRAM CO., LTD., Seoul (KR); QURAM CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/631,769

(22) Filed: Feb. 25, 2015

(65) Prior Publication Data

US 2015/0245029 A1 Aug. 27, 2015

(30) Foreign Application Priority Data

Feb. 25, 2014 (KR) .................. 10-2014-0021776
Oct. 27, 2014 (KR) .................. 10-2014-0146305

(51) Int. Cl.
| | |
|---|---|
| G06K 9/36 | (2006.01) |
| H04N 19/124 | (2014.01) |
| G06T 1/60 | (2006.01) |
| H04N 19/50 | (2014.01) |
| H04N 19/61 | (2014.01) |
| H04N 19/94 | (2014.01) |

(52) U.S. Cl.
CPC ............... *H04N 19/124* (2014.11); *G06T 1/60* (2013.01); *H04N 19/50* (2014.11); *H04N 19/61* (2014.11); *H04N 19/94* (2014.11)

(58) Field of Classification Search
CPC ...... H04N 19/124; H04N 19/50; H04N 19/61; H04N 19/593; G06K 9/36
See application file for complete search history.

(56) References Cited

U.S. PATENT DOCUMENTS

| | | | | |
|---|---|---|---|---|
| 2012/0243784 | A1* | 9/2012 | Fukuhara | ............... H04N 19/34 382/168 |
| 2013/0028515 | A1* | 1/2013 | Fukuhara | .................. G06T 5/40 382/168 |

(Continued)

FOREIGN PATENT DOCUMENTS

| | | |
|---|---|---|
| JP | 7-15347 A | 1/1995 |
| KR | 10-2010-0026779 A | 3/2010 |

*Primary Examiner* — Li Liu
(74) *Attorney, Agent, or Firm* — Knobbe Martens Olson & Bear LLP

(57) ABSTRACT

An image processing system and a method thereof is disclosed. A palette including an N number of index pixel values of a processing target image and corresponding index values is created. N is an integer equal to or smaller than 2. An image indexing process is performed on each processing target pixel. When a pixel value of the processing target pixel is a pixel value of one of the N number of index pixel values, a pixel data on a converted image corresponding to the processing target pixel is set as an index value on the palette corresponding to the pixel value of the processing target pixel. Otherwise, the pixel data on the converted image corresponding to the processing target pixel is set as an exceptional value, and the pixel value of the processing target pixel is stored in an exception buffer.

10 Claims, 10 Drawing Sheets

(56) References Cited

U.S. PATENT DOCUMENTS

| | | | |
|---|---|---|---|
| 2015/0189319 A1* | 7/2015 | Pu | H04N 19/176 375/240.03 |
| 2015/0229933 A1* | 8/2015 | Guo | H04N 19/103 375/240.02 |
| 2015/0264363 A1* | 9/2015 | Pu | H04N 19/186 375/240.02 |

* cited by examiner

Fig. 1A (PRIOR ART)

| index | RGB Value |
|-------|-----------|
| 0 | $(R_0, G_0, B_0)$ |
| 1 | $(R_1, G_1, B_1)$ |
| 2 | $(R_2, G_2, B_2)$ |
| 3 | $(R_3, G_3, B_3)$ |

$[p_1, p_2, \ldots, p_v]$ $\Downarrow$ $[d_1, d_2, \ldots, d_v]$ $\Downarrow$ $[Q(d_1), Q(d_2), \ldots, Q(d_v)]$ $\Downarrow$ $[Cal\{Q(d_1)\}, Cal\{Q(d_2)\}, \ldots, Cal\{Q(d_v)\}]$ where, $Cal\{Q(d_v)\} = \begin{cases} Q(d_v) & \text{(if } 0 \leq Q^{-1}(Q(d_v)) + pred(P_v) \leq 2^m - 1 \text{)} \\ Q(dv) - c & \text{(if } Q^{-1}(Q(d_v)) + pred(P_v) \geq 2^m - 1 \text{)} \\ Q(dv) + c & \text{(if } Q^{-1}(Q(d_v)) + pred(P_v) < 0 \text{)} \end{cases}$

ENCODING IMAGE DATA WITH QUANTIZING AND INVERSE-QUANTIZING PIXEL VALUES

CROSS REFERENCE TO RELATED APPLICATION

The present application claims priority from Korean Patent Application Number 10-2014-0021776 filed on Feb. 25, 2014, and Korean Patent Application Number 10-2014-0146305 filed on Oct. 27, 2014, the entire contents of which are incorporated herein for all purposes by this reference.

BACKGROUND OF THE INVENTION

1. Field of the Invention

The present invention relates to an image processing system and a method of providing the same, and more particularly, to an image processing system and method able to compress an original image, each pixel of which is expressed in RGB, RGBA or YUV, to an index image.

2. Description of Related Art

Recently, the amount of data for expressing a single image has significantly increased in response to gradual improvement in image quality. It is difficult to store a large number of images in a storage medium or it takes a long time to transfer image data through the network. Therefore, there is an increasing interest in a variety of methods for decreasing the amount of data related to images in order to decrease network traffics and reduce storage spaces.

A typical method for decreasing the size of an image, i.e. compressing the image, may be an image indexing method.

According to the image indexing method, an index and a pixel value of each pixel of a corresponding image (e.g. an RGB value, a YUV value, a differential value, or a quantized differential value) are stored in a table referred to as a palette or a reference table, and an actual image data is expressed as an index value of the palette. This image indexing method compresses the image by encoding (or storing) the index instead of the pixel value corresponding to the index while maintaining the index and the pixel value in the palette. The pixel value may be a color value of the pixel, or may be a data to be encoded (hereinafter referred to as an "encoding target data"), such as a differential value or a quantized differential value, with which a corresponding image is to be encoded (by, for example, Huffman coding). Although the pixel value stored in the palette may be a value expressing all of three colors, such as RGB values or YUV values, it may express each of R, G and B values.

FIG. 1A and FIG. 1B illustrate an example of an image indexing method using four colors. FIG. 1A illustrates a palette having pixel values consisting of four colors, and FIG. 1B illustrates an image having one index value of the index values of the palette shown in FIG. 1A as a pixel value. For example, referring to FIG. 1B, a pixel 1 shown in FIG. 1B has a pixel value 3. When the index is 3, the RGB values of the pixel 1 illustrated in FIG. 1B are $R_3$, $G_3$ and $B_3$, as illustrated in FIG. 1A.

In the case illustrated in FIG. 1A and FIG. 1B, for the sake of convenience, the size of the palette is 4. In a typical image indexing method, the size of the palette may be $2^8 (=256)$, and an image expressed by the image indexing method may have as many number of colors as the size of the palettes, i.e. 256 colors.

When the pixel value of each pixel of an image has RGB values or RGBA values, the size of one pixel ranges from 3 to 4 bytes. In contrast, when the same image is expressed by the image indexing method as above, the size of one pixel is 1 byte. When an image is expressed by the image indexing method, its size can be reduced to be smaller than the size of the image expressed by an RGB method. In addition, the compression efficiency of the image is improved when the image is compressed by the other methods.

However, the image indexing method has a problem in that the number of colors constituting an image is limited to be equal to or smaller than the size of the palette.

By the way, a pixel value corresponding to an index may be a data to be encoded (by, for example, Huffman coding). Therefore, the pixel value may be a differential value or a value obtained by quantizing the differential value. In this case, it is preferable that the pixel value corresponding to the index is expressed by a length (e.g. 1 byte) indicating the color value of the original pixel. Specifically, in the case in which the color value of the pixel is expressed by 1 byte, if the differential value indicating the difference between the color values of two pixels is negative, 9 bits are needed since 1 bit is used to indicate that the differential value is negative. In this case, the compression efficiency of an index image is significantly lowered, which is problematic.

In general, it is known that lossless compression does not require the sign bit of the differential value to be stored. However, lossy compression requires the sign bit of the differential value (i.e. the quantized differential value) to be stored. This will be described as follows with reference to FIG. 2.

FIG. 2 illustrates an example of an encoding method of the related art.

Referring to FIG. 2, the encoding method of the related art encodes target data, for example, $p_1$ to $p_v$ from among a set of data (e.g. an image or a frame of video). The set of data may be an image, and the target data may be pixel values, i.e. data corresponding to pixels included in the image or the frame of the video.

In this case, an encoding system does not encode individual target data, for example, $p_1$ to $p_v$, but encodes a difference data, for example, $p_v$-pred($p_v$), between a specific target data, for example, $p_v$, and a predicted data, for example, pred($p_v$), of the specific target data $p_v$ in order to encode the specific target data $p_v$. The difference data is also referred to as a differential value. It is well known that the predicted data pred($p_v$) may be a value corresponding to a pixel (e.g. a left pixel) close to the specific target data when the predicted data is an image, and that the predicted data may be implemented as a variety of forms.

As is well known, in the case of encoding difference data, for example, p1-pred(p1), p2-pred(p2), . . . , and $p_v$-pred($p_v$), corresponding to the target data $p_1$ to $p_v$ instead of directly encoding the target data $p_1$ to $p_v$, the compression ratio is high since there are more data having the same value. In addition, when a target data, for example, $p_v$, is restored through decoding, an encoded difference data, for example, encoded($p_v$-pred($p_v$)), is decoded, and the target data $p_v$ is restored using the decoded data $p_v$-pred($p_v$) and a predicted data, for example, pred($p_v$), for example, by adding the decoded data and the predicted data.

When the difference data p1-pred(p1), p2-pred(p2), . . . , and $p_v$-pred($p_v$) are encoded, lossless compression is carried out unless the target data $p_1$ to $p_v$ are compressed values (e.g. quantized values).

In this lossless compression, when encoded data is restored (like as $p_v$), the value of the restored data is within a predetermined range since the restored data is an original target data. That is, when each of the target data $p_1$ to $p_v$ is expressed by n bits (n is a natural number, for example, 8), the value of each target data is in a normal range of from 0 to $2^n-1$.

I.e. in lossless compression, even the difference data $p_1$-pred($p_1$), $p_2$-pred($p_2$), . . . , and $p_v$-pred($p_v$) which to be encoded, are negative values, when the target data $p_1$ to $p_v$ are restored (i.e. acquired) using the difference data $p_1$-pred($p_1$), $p_2$-pred($p_2$), . . . , and $p_v$-pred($p_v$), the values of the data restored through decoding are within the normal range since the restoration data become the target data $p_1$ to $p_v$ itself. Thus, even if at least one of the encoding target data, i.e. the difference data $p_1$-pred($p_1$), $p_2$-pred($p_2$), . . . , and $p_v$-pred ($p_v$), is a negative number, the values of the target data $p_1$ to $p_v$ obtained from the difference data $p_1$-pred($p_1$), $p_2$-pred ($p_2$), . . . , and $p_v$-pred($p_v$) are always within the normal range.

It is also known, in this case, that the target data $p_1$ to $p_v$ can be normally restored without the sign bits of the difference data $p_1$-pred($p_1$), $p_2$-pred($p_2$), . . . , and $p_v$-pred($p_v$) being stored. Therefore, a lossless compression process in an encoding solution of the related art, such as joint photographic experts group-lossless (JPEG-LS) or portable network graphics (PNG), uses a variety of methods of selectively changing or neglecting some bits of pixel data without storing the sign bits.

However, in the case of lossy compression, the encoding target data should be data which is quantized value of the difference data $p_1$-pred($p_1$), $p_2$-pred($p_2$), . . . , and $p_v$-pred ($p_v$), i.e. quantization result data, for example, $Q(p_1$-pred ($p_1$)), $Q(p_2$-pred($p_2$)), . . . , and $Q(p_v$-pred($p_v$)). When restoration is performed using the quantization result data, the result of the restoration may differ from the target data $p_1$ to $p_v$ itself with a certain error. Due to this error, the solution fails to ensure that the restoration data are within the normal range. Therefore, restoration is not normally performed unless the sign bits of the encoding target data $Q(p_1$-pred($p_1$)), $Q(p_2$-pred($p_2$)), . . . , and $Q(p_v$-pred($p_v$)) are stored. In addition, the encoding solution of the related art also stores the sign bits of the encoding target data in the case of lossy compression.

In the case in which the sign bits are stored as above, at least one bit must be used for storing a sign bit, thereby lowering the compression ratio compared to the case in which no sign bits are stored. This problem still remains in the case in which the index image is used as described above and pixel values corresponding to the indexes are difference data, i.e. differential values (including quantized differential values).

The information disclosed in the Background of the Invention section is provided only for better understanding of the background of the invention and should not be taken as an acknowledgment or any form of suggestion that this information forms a prior art that would already be known to a person skilled in the art.

BRIEF SUMMARY OF THE INVENTION

Various aspects of the present invention provide an extensive image indexing method improved from an image indexing method of the related art and able to express more colors than a palette offers and express an image by the image indexing method of the related art without a significant increase in the size of the image, and an image processing system and method able to perform the extensive image indexing method.

Also provided are a system and method able to carry out lossy compression without storing the sign bit of a data to be encoded. Accordingly, provided are a system and method able to easily use an image indexing method when using a quantized differential value as a pixel value corresponding to an index while carrying out lossy compression, and improve compression ratio since no sign bit is required to be stored.

In an aspect of the present invention, provided is An image processing system comprising: a palette module creating a palette including an N number of index pixel values from among pixel values of each of pixels included in a processing target image, where the N is an integer equal to or smaller than 2, and index values corresponding to the index pixel values; and a control module performing an image indexing process, wherein the image indexing process by the control module is performed on each of processing target pixels included in the processing target image, and wherein the image indexing process comprises: when a pixel value of the processing target pixel is a pixel value of one of the N number of index pixel values, setting a pixel data on a converted image corresponding to the processing target pixel as an index value on the palette corresponding to the pixel value of the processing target pixel; and when the pixel value of the processing target pixel is not the pixel value of one of the N number of index pixel values, setting the pixel data on the converted image corresponding to the processing target pixel as an exceptional value, and storing the pixel value of the processing target pixel in an exception buffer.

In an aspect of the present invention, the image processing system comprises a selection module calculating frequencies of the pixels included in the processing target image according to pixel values, and selecting an N number of pixel values having greater frequencies as the N number of index pixel values.

In an aspect of the present invention, the control module performs the image indexing process when a ratio of B to A is equal to or greater than a predetermined threshold ratio, where the A is a total number of the processing target pixels, and the B is a total number of pixels, each pixel value of which is one of the N number of index pixel values, from among the pixels included in the processing target image.

In an aspect of the present invention, the N may be 2m−1, where the m is a natural number, and the exceptional value is 2m−1.

In an aspect of the present invention, the image processing system according to claim 1, comprises a creation module creating the converted image, wherein the converted image comprises a palette part on which the palette is recorded, an image part on which a pixel data on the converted image corresponding to each of the pixels included in the processing target image is recorded, and an exception buffer part on which a pixel value stored in the exception buffer is recorded.

In an aspect of the present invention, the pixel values comprise an encoding target data based on quantized values of differential values corresponding to the pixels of the processing target image. The encoding target data is defined such that, when a restoration data obtained by restoring the quantized values of the differential values is within a normal range. The quantized values are specified as the encoding target data and when the restoration data obtained by restoring the quantized values of the differential values is not within the normal range, a correction data obtained by correcting the quantized values such that the restoration data obtained by restoring the correction data is within the normal range is specified as the encoding target data.

In an aspect of the present invention, the encoding target data comprises the quantized values or the correction data from which a sign bit of the quantized values or the correction data is excluded.

In another aspect of the present invention, an image processing system is provided. The image processing system includes a quantization module acquiring a quantization result data by quantizing a quantization target data; a restoration data acquiring module acquiring a restoration data of the quantization result data; and a correction module specifying a correction data as an encoding target data, wherein, when the restoration data is not within a normal range, the correction data is obtained by correcting the quantization result data such that the restoration data obtained by restoring the correction data is within the normal range.

The encoding target data can comprise a data from which a sign bit of the correction data is excluded.

In another aspect of the present invention, an image processing method comprises: creating, at an image processing system, a palette including an N number of index pixel values from among pixel values of each of pixels included in a processing target image, where the N is an integer equal to or smaller than 2, and index values corresponding to the index pixel values; and performing, at the image processing system, an image indexing process on the processing target image, wherein the image indexing process is performed on each of processing target pixels included in the processing target image, and comprises when a pixel value of the processing target pixel is a pixel value of one of the N number of index pixel values, setting a pixel data on a converted image corresponding to the processing target pixel as an index value on the palette corresponding to the pixel value of the processing target pixel; and when the pixel value of the processing target pixel is not the pixel value of one of the N number of index pixel values, setting the pixel data on the converted image corresponding to the processing target pixel as an exceptional value, and storing the pixel value of the processing target pixel in an exception buffer.

The image processing method according can further comprise calculating frequencies of the pixels included in the processing target image according to pixel values; and selecting an N number of pixel values having greater frequencies as the N number of index pixel values.

The pixel data on the converted image may be set as the index value on the palette or the exceptional value when a ratio of B to A is equal to or greater than a predetermined threshold ratio, where the A is a total number of processing target pixels, and the B is a total number of pixels, each pixel value of which is one of the N number of index pixel values, from among the pixels included in the processing target image.

The image processing method further comprises creating the converted image, wherein the converted image comprises a palette part on which the palette is recorded, an image part on which a pixel data on the converted image corresponding to each of the pixels included in the processing target image is recorded, and an exception buffer part on which a pixel value stored in the exception buffer is recorded.

The pixel values may comprise an encoding target data based on quantized values of differential values corresponding to the pixels of the processing target image. The encoding target data is defined such that, when a restoration data obtained by restoring the quantized values of the differential values is within a normal range, the quantized values are specified as the encoding target data, and when the restoration data obtained by restoring the quantized values of the differential values is not within the normal range, a correction data obtained by correcting the quantized values such that the restoration data obtained by restoring the correction data is within the normal range is specified as the encoding target data.

The encoding target data may comprise the quantized values or the correction data from which a sign bit of the quantized vales or the correction data is excluded.

In another aspect of the present invention, an image processing method comprises: acquiring, at an image processing system, a quantization result data by quantizing a quantization target data corresponding to each of pixels included in a processing target image; acquiring, at the image processing system, a restoration data of the quantization result data; and defining, at the image processing system, an encoding target data such that, when the restoration data is within a normal range, the quantization result data is specified as the encoding target data, and when the restoration data is not within the normal range, a correction data obtained by correcting the quantization result data such that the restoration data obtained by restoring the correction data is within the normal range is specified as the encoding target data.

In an aspect of the present invention, the encoding target data comprises the quantization result data or the correction data from which a sign bit of the quantization result data or the correction data is excluded.

According to the principle of the present invention, it is possible to compress an image to an index image using indexes having a limited size (e.g. 256 indexes) when the image has more types of pixel values than the size of the indexes.

In addition, in pixel values constituting a processing target image, the pixel values excluded from a predetermined number of index values (e.g. 255 index pixel values when 256 indexes are used) are mapped to one or more exceptional values (exception indexes), and the pixel values of actual pixels are stored in a separate exception buffer. It is therefore possible to carry out lossless compression through index processing without causing a damage in the quality of the processing target image.

When an encoding target data (e.g. the index pixel values) is specified (stored) while lossy compressing is being carried out through quantization, the encoding target data is corrected such that a data obtained by restoring the encoding target data to an original target data is always within a normal range. Accordingly, it is not required to store a sign bit even in the case in which the encoding target data has a negative value.

Furthermore, since the sign bit is not stored, a ratio compression can be significantly increased.

The methods and apparatuses of the present invention have other features and advantages that will be apparent from, or are set forth in greater detail in the accompanying drawings, which are incorporated herein, and in the following Detailed Description of the Invention, which together serve to explain certain principles of the present invention.

BRIEF DESCRIPTION OF THE DRAWINGS

A brief description is given for the enhancement of understanding of the accompanying drawings, in which:

FIG. 1A and FIG. 1B illustrate an example of an image indexing method of the related art;

DETAILED DESCRIPTION OF THE INVENTION

Figure 1B:
Figure 2:
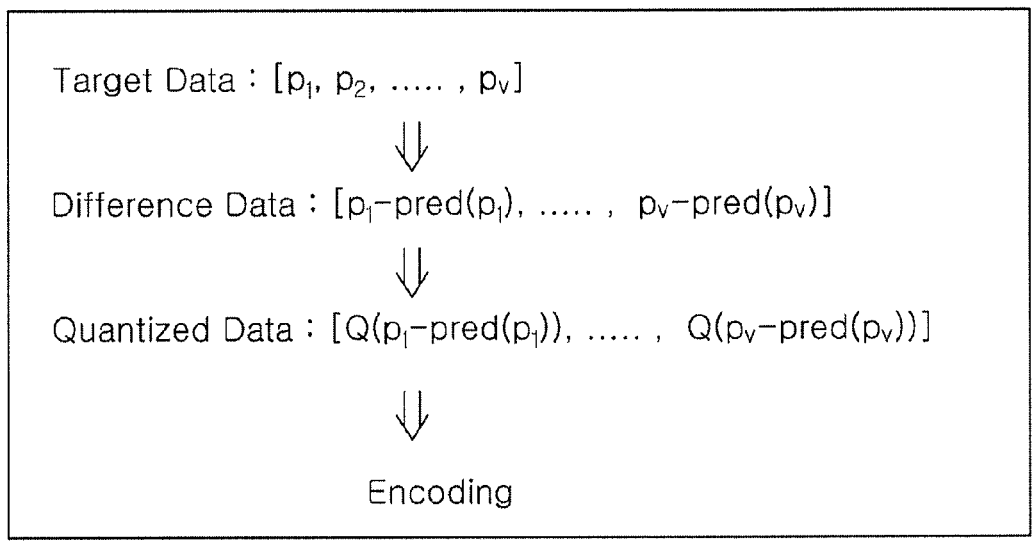
FIG. 2 illustrates an encoding method of the related art.

The present invention has other advantages associated with the operation of the present invention and objects that are realized by the practice of the present invention which will be apparent from, or are set forth in greater detail in the accompanying drawings, which are incorporated herein, and in the following Detailed Description of the Invention, which together serve to explain certain principles of the present invention.

Herein, it will be understood that, when an element is referred to as "transmitting" a data to another element, the element not only can directly transmit the data to another element but also indirectly transmit the data to another element via at least one intervening element.

In contrast, when an element is referred to as "directly transmitting" a data to another element, the element can transmit the data to another element without an intervening element.

The present invention will now be described more fully hereinafter with reference to the accompanying drawings, in which exemplary embodiments thereof are shown. Reference should be made to the drawings, in which the same reference numerals and signs are used throughout the different drawings to designate the same or similar components.

Figure 3:
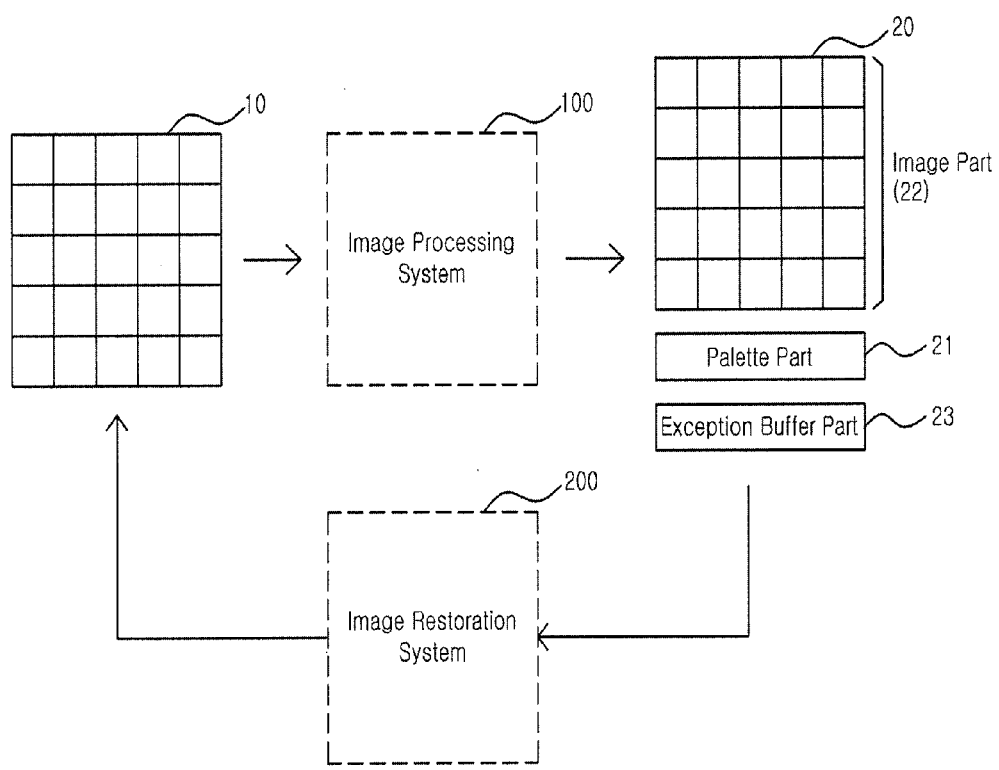
FIG. 3 schematically illustrates the operation of an image processing system according to an exemplary embodiment of the present invention.

FIG. 3 schematically illustrates the operation of an image processing system 100 and an image restoration system 200 according to an exemplary embodiment of the present invention. Referring to FIG. 3, the image processing system 100 and/or the image restoration system 200 may be provided in order to embody an image processing method according to the principle of the present invention.

The image processing system 100 serves to create a converted image 20, for example, an index image, corresponding to an image to be processed (hereinafter referred to as a "processing target image") 10 by processing the processing target image 10. The image restoration system 200 serves to restore the created converted image 20 to the processing target image 10.

The processing target image 10 may indicate an original image before encoding. The processing target image may indicate data, each pixel of which has a predetermined pixel value. Each pixel value may be a numerical value expressed by, for example, an RGB color model, a YCbCr color model, an HIS color model, or CMYK color model. In some implementations, the pixel value may indicate a differential value created based on the color value, or a quantized differential value when lossy compression is carried out. A method of creating a differential value or a quantized differential value corresponding to each pixel for the purpose of compression to a predetermined format from an original image will not be described in detail, since the method is well known.

The converted image 20 is a result created by the image processing system 100, and may be an image expressing the same content as the processing target image 10 in a different format. The converted image 20 may be, for example, an index image according to the principle of the present invention. In addition, the converted image 20 may be data that have been performed of encoding (e.g. Huffman coding) after indexing according to the principle of the present invention.

As illustrated in FIG. 3, the converted image 20 includes a palette part 21, an image part 22, and an exception buffer part 23. The palette part 21 is a part on which a palette that will be described later is recorded. The image part 22 is a part on which a pixel data on the converted image corresponding to the pixel value of each pixel included in the processing target image is recorded. The exception buffer part 23 is a part on which a pixel value of the processing target image is recorded, the pixel value being exception-processed and stored in an exception buffer.

In some embodiments, the converted image 20 may be created in the form of an independent file including only the image part 22, and the palette part 21 and/or the except buffer part 23 may be embodied in the form of a separate file (e.g. a meta file).

The image processing system 100 and/or the image restoration system 200 may be a configuration provided in a data processing device (e.g. a computer or a mobile terminal), the configuration being systematically combined with hardware provided in the data processing device and a set of software codes defined to embody the principle of the present invention.

Figure 4:
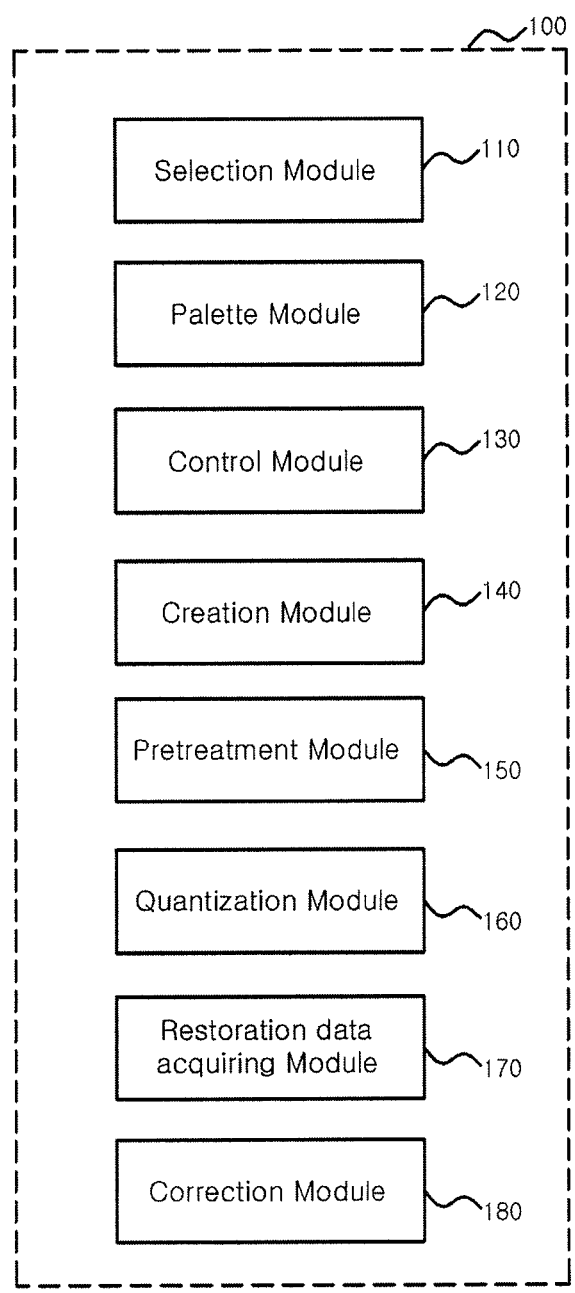
FIG. 4 is a block diagram schematically illustrating the configuration of the image processing system according to an exemplary embodiment of the present invention.
Figure 5:
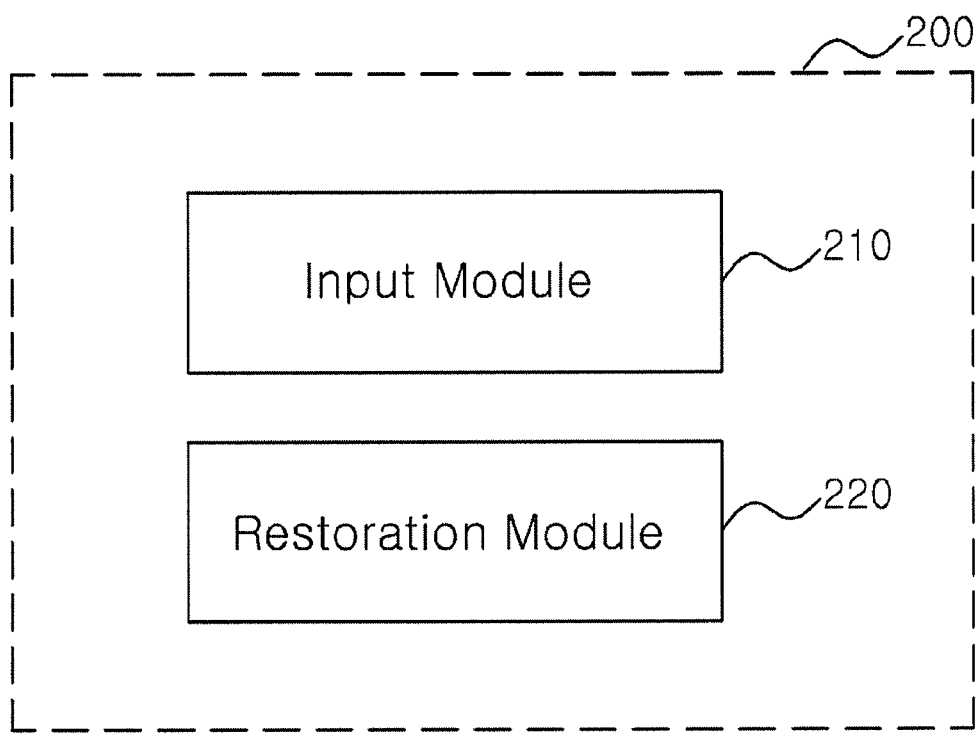
FIG. 5 is a block diagram schematically illustrating the configuration of an image restoration system according to an exemplary embodiment of the present invention.

FIG. 4 is a block diagram schematically illustrating the configuration of the image processing system 100 according to an exemplary embodiment of the present invention, and FIG. 5 is a block diagram schematically illustrating the configuration of the image restoration system 200 according to an exemplary embodiment of the present invention.

Referring to FIG. 4, the image processing system 100 according to an embodiment of the present invention includes a selection module 110, a palette module 120, a control module 130, and a creation module 140. The image processing system 100 further includes a pretreatment module 150, a quantization module 160, a restoration data acquiring module 170, and/or a correction module 180 as components with which a sign bit is not stored when the pixel data of a converted image (or an index image) is negative, which will be described later. Referring to FIG. 5, the image restoration system 200 according to an embodiment of the present invention includes an input module 210 and a restoration module 220.

In some embodiments of the present invention, some of the above-described components may not be necessary for implementing the present invention. The image processing system 100 and/or the image restoration system 200 may include more components in some embodiments.

Each of the image processing system 100 and the image restoration system 200 may have a hardware resource and/or a software resource in order to embody the principle of the present invention, and does not necessarily indicate a single physical component or a single device. Specifically, the image processing system 100 and the image restoration system 200 may be implemented as a logical combination of hardware and/or software provided to embody the principle of the present invention, and if necessary, may be implemented as an assembly of logical components disposed at separate devices to perform their own functions in order to embody the principle of the present invention. In addition, the image processing system 100 and the image restoration system 200 may indicate an assembly of components provided according to the functions or roles to embody the principle of the present invention. For example, the selection module 110, the palette module 120, the control module 130, the creation module 140, the pretreatment module 150, the quantization module 160, the restoration data acquiring module 170, the correction module 180, the input module 210, and/or the restoration module 220 may be located in different physical devices or the same physical device. In addition, in some implementations, the elements of the individual modules, such as the selection module 110, the palette module 120, the control module 130, the creation module 140, the pretreatment module 150, the quantization module 160, the decoding module 170, the correction module 180, the input module 210, and/or the restoration module 220, may be located in different physical devices such that they are systematically combined in order to realize functions that are performed by individual modules.

Herein, the term "module" may refer to a functional and/or structural combination of hardware for embodying the principle of the present invention and software for enabling the hardware to operate. For example, the module may indicate a logical unit of codes and hardware resources that execute the codes. It is apparent to a person skilled in the art to which the present invention relates that the module does not necessarily indicate either physically-connected codes or one type of hardware.

First, referring to FIG. 4, the control module 130 serves to control the functions and/or resources of the other components (e.g. the selection module 110, the palette module 120, the creation module 140, the pretreatment module 150, the quantization module 160, the restoration data acquiring module 170, and/or the correction module 180) of the image processing system 100.

The selection module 110 serves to select an N number of pixel values as index pixel values from a set of pixel values (e.g. color values, differential values or quantized differential values) corresponding to the pixels included in the processing target image 10. The palette module 120 serves to create a palette including the selected N number of index pixel values. Here, N is a predefined value, which is an integer equal to or greater than 2.

The palette is a table including a plurality of index pixel values and index values respectively corresponding to the index pixel values, and is also referred to as a reference table or the like.

The palette includes only items related to the index pixel values (i.e. pairs of an index pixel value and a corresponding index value). In some implementations, the palette may further include items related to pixel values except for the index pixel values (i.e. pairs of a pixel value and a corresponding index value). For example, the palette created by the palette module 120 includes items related to the whole pixel values constituting the processing target image 10. However, in this case, the index pixel values may also be the N number of pixel values selected by the selection module 110.

The selection module 110 checks the whole pixel values included in the processing target image 10, and subsequently selects some pixel values (i.e. an N number of pixel values) from the whole pixel values.

The selection module 110 selects the N number of index values by a variety of methods. For example, the selection module 110 may randomly select an N number of pixel values from the whole pixel values constituting the processing target image 10, or may select a first N number of pixel values from the whole pixel values.

In addition, according to an embodiment, the selection module 110 may calculate the frequency of each pixel value of the pixels included in the processing target image 10, and may select an N number of pixel values having greater frequencies as the N number of index pixel values. It is also possible to sequentially arrange the pixel values according to the frequencies. In this manner, the image processing system 100 can further compress the size of the final result, the converted image 20. The reason for the further compression will be more apparent from the following description.

When the processing target image 10 is composed of pixel values, the number of which is equal to or smaller than N, i.e. the number of the index pixels, conversion may be performed by the image indexing method of the related art (i.e. a method in which the pixel values of the whole pixels have the index values in the palette), and the principle of the present invention may be applied to the case in which the number of the pixel values of the processing target image 10 is greater than N. For example, when the number of the index pixel values is 255, the processing target image 10 may be an image composed of 512 colors to which the image indexing method of the related art is not applicable.

The control module 130 sets a pixel data on the converted image 20 corresponding to each pixel value of the processing target image 10. This will be described mainly with reference to FIG. 6 and subsidiarily with reference to FIG. 7.

Figure 6:
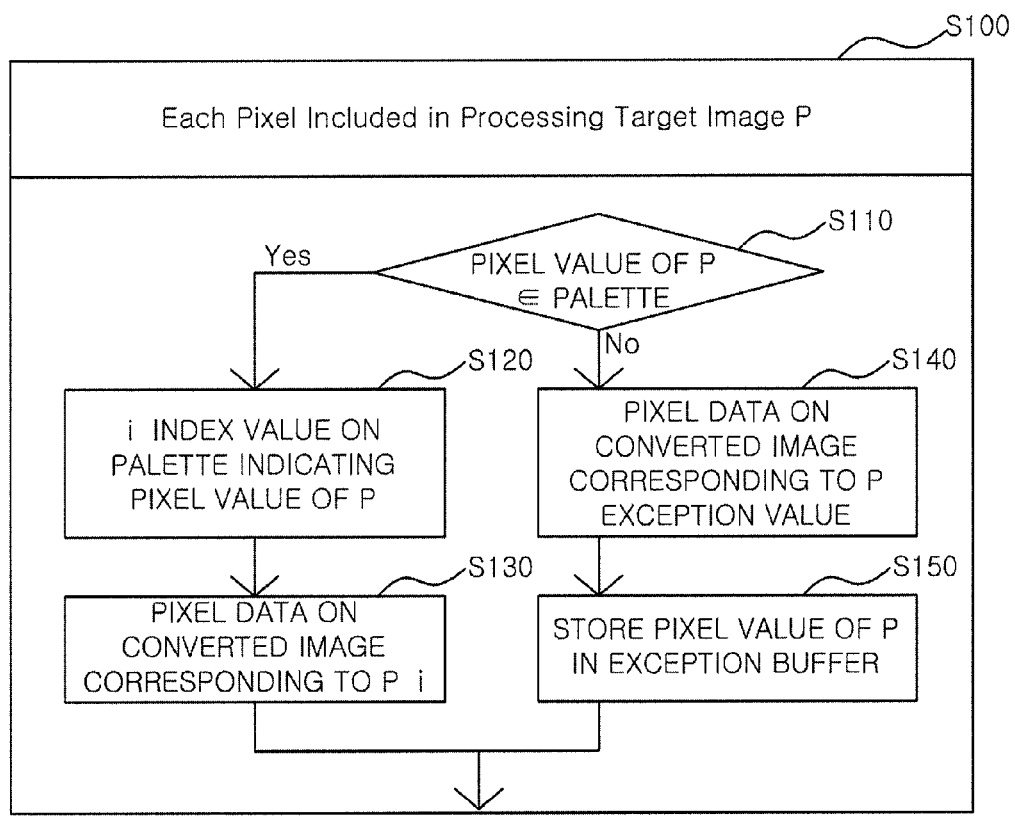
FIG. 6 is a flowchart illustrating a process carried out by the image processing system according to an exemplary embodiment of the present invention.

FIG. 6 is a flowchart illustrating a process carried out by the control module 130. Referring to FIG. 6, the control module 130 performs indexing process to the pixel value of each pixel to be processed (hereinafter referred to as a "processing target pixel") P included in the processing target image (S100).

The control module 130 determines whether or not the pixel value of the processing target pixel P is one of the N number of index pixel values in the palette (S110).

If the pixel value of the processing target pixel P is one of the N number of index pixel values in the palette, the control module 130 sets a pixel data on the converted image corresponding to the processing target pixel P as an index value on the palette indicating the pixel value of the processing target pixel P (S120, S130).

If the pixel value of the processing target pixel P is not one of the N number of index pixel values in the palette, the control module 130 sets the pixel data on the converted image corresponding to the processing target pixel P as an exceptional value (S140), and stores the pixel value of the processing target pixel P in the exception buffer (S150).

The exception buffer may be means for storing actual pixel values corresponding to the exceptional value (or exception index). The exception buffer may be physically included in the palette. Pixel values corresponding to exceptional values in a physically continuous manner may be stored in the exception buffer.

Whenever the pixel value of a processing target pixel P does not correspond to any one of the N number of index pixel values, the control module 130 sequentially stores the pixel value of the processing target pixel P in the exception buffer. Specifically, while the control module 130 is sequentially indexing the processing target pixels as above, when a pixel value does not correspond to any one of the N number of index pixel values (hereinafter referred to as the "case of exceptional processing"), the control module 130 stores the pixel value of the processing target pixel in the first position of the exception buffer. When the case of exceptional processing occurs again, the control module 130 stores the pixel value of the processing target pixel in the second position of the exception buffer. In this manner, the control module 130 sequentially stores the pixel values of the processing target pixels in the exception buffer.

According to an embodiment, N is $2^m-1$, where m is a natural number, and the index corresponding to the index pixel values ranges from 0 to $2^m-2$. In this case, the exceptional value is $2^m-1$.

According to an embodiment, the pixel data of each pixel of the converted image 20 is expressed by 1 byte. For this case, m is set to 8. In this case, N is 255, and the index values on the palette range from 0 to 254. As described above, the control module 130 sets the pixel data on the converted image corresponding to each processing target pixel as one of the index values 0 to 254 or the exceptional value 255, such that each pixel on the converted image 20 can be expressed by 1 byte. However, this is not intended to be limiting, and m may be set, for example, to 16, 32, or 64.

Figure 7:
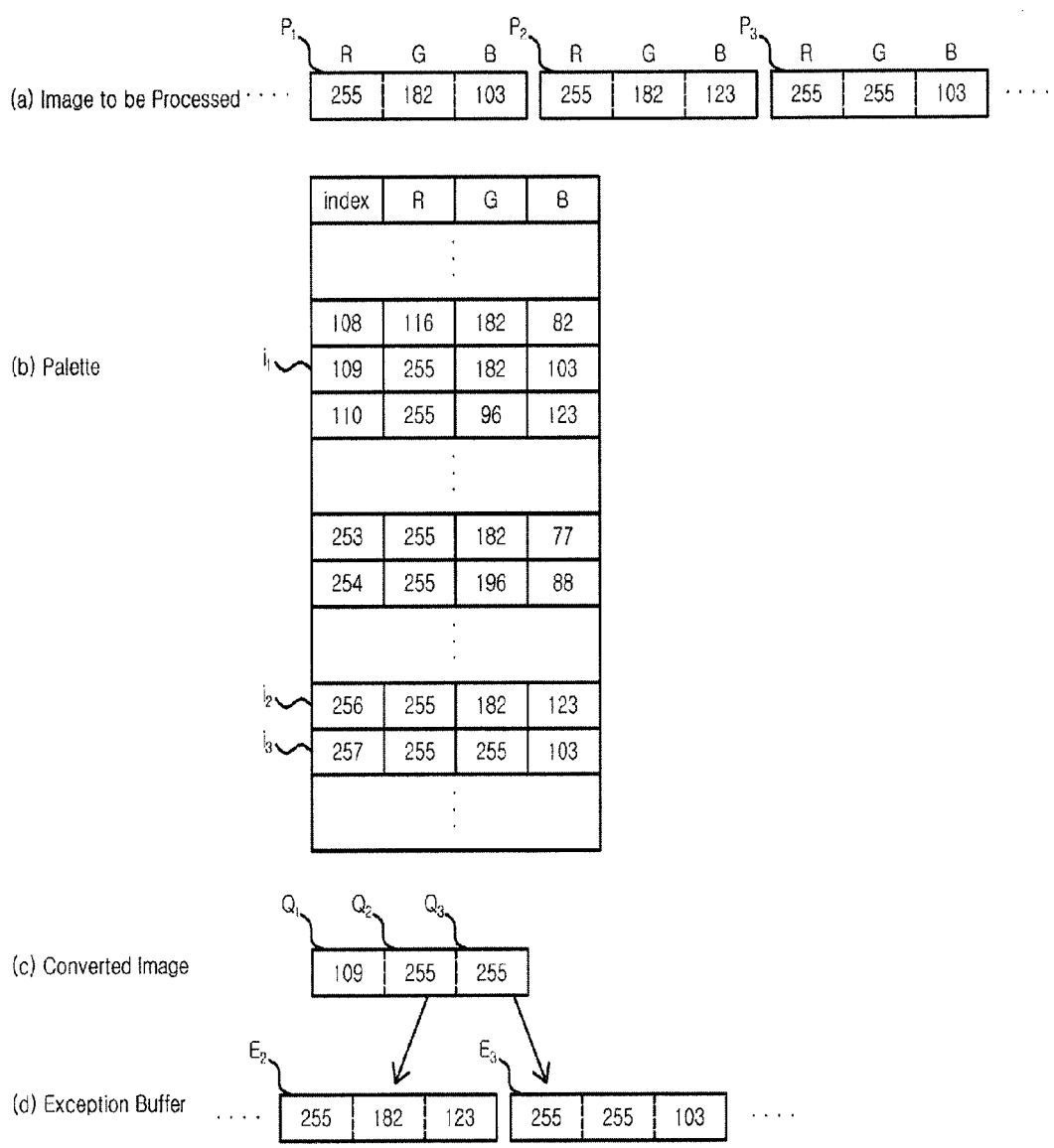
FIG. 7 illustrates an example in which pixels on a processing-target image are processed and subsequently are set as corresponding pixel data on a converted image by the image processing system according to an exemplary embodiment of the present invention.

FIG. 7 illustrates an example in which the control module 130 processes pixels on an processing target image and subsequently sets the pixels as corresponding pixel data on a converted image. FIG. 7 illustrates a case in which each pixel value is an RGB color value. Specifically, part (a) of FIG. 7 illustrates the RGB color values of some pixels included in the image, part (b) of FIG. 7 illustrates a part of a palette created by the selection module 110 and the palette module 120, and part (c) of FIG. 7 illustrates the pixel data of some pixels on the converted image set by the control module 130.

In the example illustrated in FIG. 7, the pixel values, i.e. RGB values 255, 182, and 103, of a pixel P1 of the processing target image are an item i1 included in the palette. The control module 130 sets the pixel data of a pixel Q1 on the converted image corresponding to the processing target pixel P1 as an index value 109 of the item i1.

An index of item i2 on the palette corresponding to the pixel values, i.e. RGB values 255, 182, and 123, of a pixel P2 of the processing target image is 256, which does not correspond to any one of the index pixel values (i.e. color values corresponding to indexes 0 to 254). The control module 130 sets the pixel data of a pixel Q2 on the converted image corresponding to the pixel P2 of the processing target image as an exceptional value 255, and stores the pixel value, i.e. the RGB values 255, 182, and 123, of the pixel P2 of the processing target image in an exception buffer E2.

In addition, an index of item i3 on the palette corresponding to the pixel values, i.e. RGB values 255, 255, and 103, of a pixel P3 of the processing target image is 257, which does not correspond to any one of the index pixel values. The control module 130 sets the pixel data of a pixel Q3 on the converted image corresponding to the pixel P3 of the processing target image as an exceptional value 255, and sequentially stores the pixel value, i.e. the RGB values 255, 255, and 103, of the pixel P3 of the processing target image in an exception buffer E3 next to the exception buffer E2.

Since the N number of index pixel values consists of only the pixel values having greater frequencies on the processing target image from among the pixel values of the processing target image as described above, each of most of the pixel data included in the converted image has an index value on the palette, and a small number of pixels of the converted image has an exceptional value. Accordingly, a small number of pixel values is stored in the exception buffer (i.e. the number of pixel data having an exceptional value in the converted image).

Therefore, unlike the related art, the use of the palette according to the principle of the present invention enables lossless compression through indexing process even in the case in which the number of pixel values of an image is greater than the size of the palette (e.g. 256). In addition, since some of the pixel values of the processing target image excluded from the palette are stored in the separate exception buffer instead of being lost, the quality of the processing target image is not damaged.

In the case in which the total number of pixels included in the processing target image is A and the total number of pixels having one of the N number of index pixel values from among the pixels included in the processing target image is B, when the ratio of B to A is equal to or greater than a predetermined threshold ratio (e.g. 50% or 70%), the indexing process as illustrated in FIG. 6 can be performed. When the ratio of B to A is too small, the efficiency of reducing the image size according to the principle of the present invention may be lowered.

Returning to FIG. 4, the creation module 140 creates the converted image 20.

The converted image 20 includes the image part 22 in which pixel data on the converted image corresponding to the pixels included in the processing target image are recorded. In some implementations, the converted image 20 further includes the palette part 21 in which the palette is recorded and/or the exception buffer part 23 in which the pixel values stored in the exception buffer are recorded.

In an implementation in which the converted image includes only the image part 22, the palette part 21 and/or the exception buffer part 23 may be stored in a separate file or a separate storage space.

In addition, in an embodiment, the creation module 140 may create the converted image by compressing the palette part, the image part, and the exception buffer part. In addition, the image part may be compressed through encoding (e.g. Huffman coding).

A description will be given below of the configuration of the image restoration system 200 with reference to FIG. 5.

Referring to FIG. 5, the input module 210 receives the converted image 20 created by the image processing system 100, the converted image 20 being to be restored. When the converted image 20 is compressed, the converted image 20 may be input after being decompressed. When the converted image 20 is encoded (by, for example, Huffman coding), the converted image 20 may be input into the input module 210 after being created through decoding.

The restoration module 220 restores the converted image 20 to the processing target image 10 for each restoration target pixel (hereinafter referred to as a "restoration target pixel") included in the converted image 20 through the following process.

First, the restoration module 220 determines whether or not the pixel data of the restoration target pixel is an exceptional value, for example, 255.

If the pixel data of the restoration target pixel is the exceptional value, a pixel value corresponding to the restoration target pixel is loaded from the exception buffer. As described above, the image processing system 100 sequentially records pixel values in the exception buffer in the order in which processing target pixels are processed. Thus, the restoration module 220 processes restoration target pixels in the order in which the image processing system 10 has processed the pixels, and whenever the pixel data of any one of the restoration target pixels has an exceptional value, sequentially loads the corresponding pixel value from the exception buffer. The restoration module 220 determines the loaded pixel value to be the pixel value of the pixel on the processing target image corresponding to the restoration target pixel.

If the pixel value of the restoration target pixel is an index value on the palette corresponding to any one of the N number of index pixel values, the index pixel value corresponding to the index value is determined to be the pixel value of the pixel on the processing target image corresponding to the restoration target pixel.

When the pixel values of the whole restoration target pixels included in the converted image 20 are determined in this manner, the restoration module 220 restores the processing target image using the determined pixel values of the restoration target pixels. When a pixel value is a quantized differential value, inverse quantization is carried out, and the color value of the pixel is restored based on a predicted data.

By the way, as described above, the pixel value corresponding to each index value on the palette may be a differential value or a quantized differential value. That is, the pixel value may be an encoding target data to be encoded (by, for example, Huffman coding). The encoding target data is formed as a data corresponding to the converted image by the indexing process as described above, and this data may be encoded (by, for example, Huffman coding).

When the encoding target data is the quantized differential value (i.e. the data to be encoded is lossy-compressed), the quantized differential value may be a negative value as above, in which case a sign bit must be stored in the related art. In this case, as described above, there is a problem in that it is difficult to express an index image or that the compression efficiency is low.

Therefore, according to the principle proposed herein, a sign bit may not be stored even in the case in which an encoding target data (e.g. a pixel value as described above) is a quantized differential value during encoding. Although this principle is applicable to the case in which not only an image but also any data which should be encoded, a description will be given below of the case in which an image is compressed by way of example.

Figure 8:
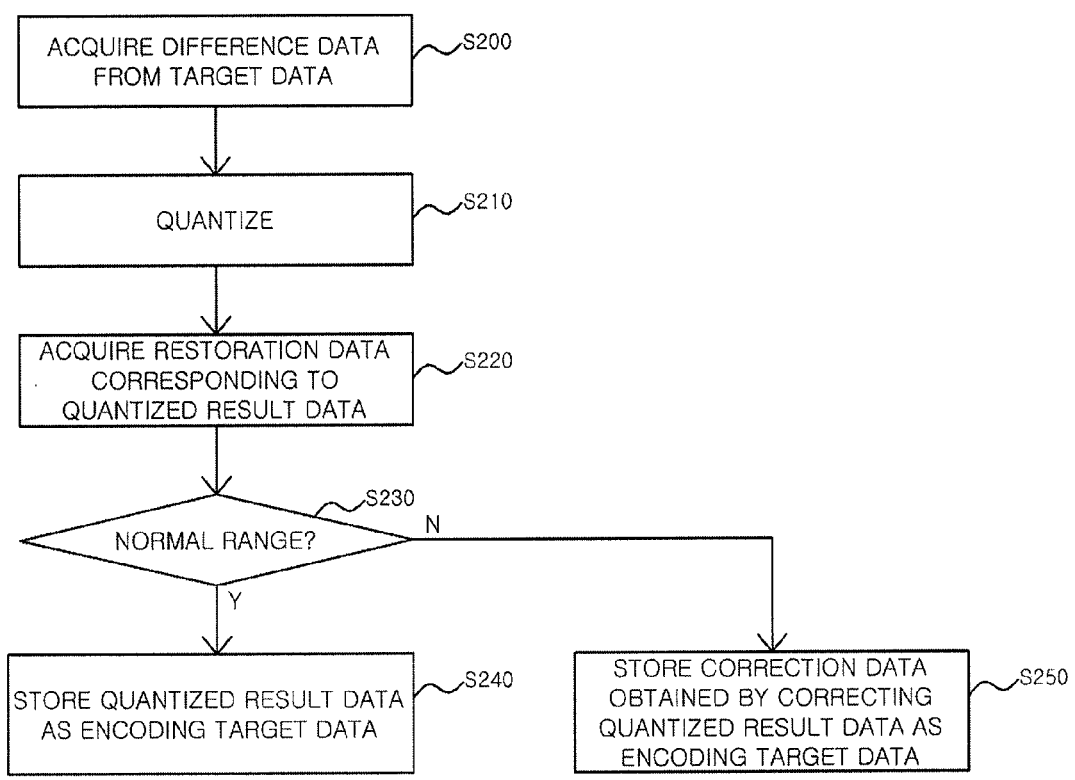
FIG. 8 illustrates a process in which the image processing system according to an exemplary embodiment of the present invention specifies an encoding target data.
Figure 9:
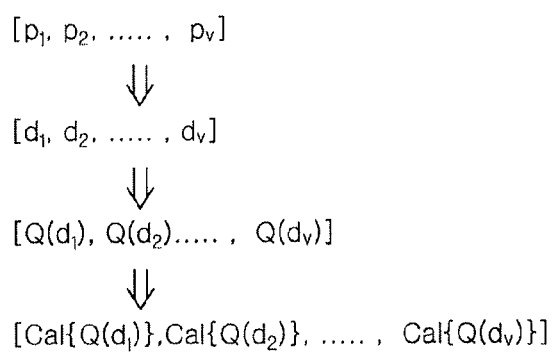
FIG. 9 illustrates an encoding process carried out according to an exemplary embodiment of the present invention.

FIG. 8 illustrates a process in which the image processing system according to an exemplary embodiment of the present invention specifies an encoding target data, and FIG. 9 illustrates an encoding process carried out according to an exemplary embodiment of the present invention.

Referring to FIG. 8 and FIG. 9, an encoding system according to the principle of the present invention, for example, the image processing system 100 illustrated in FIG. 3, acquires a difference data, i.e. differential values, for example, $d_1, \ldots, d_v$, from a target data, for example, $p_1$ to $p_v$ (S200). Here, the following formula is satisfied: $d_v=p_v-pred(p_v)$.

The target data, for example, $p_1$ to $p_v$, may indicate significant data that the image processing system 100 stores or uses. In an example, the target data $p_1$ to $p_v$ may be a data corresponding to each pixel of an image or a video frame. However, this is not intended to be limiting, but any significant data that can be compressed by the image processing system 100 may be the target data $p_1$ to $p_v$.

In addition, the image processing system 100 may encode the difference data $d_1, \ldots,$ and $d_v$ in order to encode the target data $p_1$ to $p_v$.

The use of the difference data $d_1, \ldots,$ and $d_v$ can increase values iteratively occurring between data sets to be actually encoded.

Afterwards, the image processing system 100 quantizes the difference $d_1, \ldots,$ and $d_v$ in order to carry out lossy compression (S210). In this case, the difference data $d_1, \ldots,$ and $d_v$ may be data to be quantized, i.e. quantization target data.

Quantization may be performed via a quantization function, for example, Q( ). A variety of quantization methods is applicable according to the principle of the present invention.

In an example, the quantization function may round a value obtained by dividing a data to be quantized, i.e. a quantization target data, with a quantization level value, for example, q. In this case, the quantization function is defined by Formula 1 below:

$$Q=[(d+q/2)/q] \qquad \text{Formula 1,}$$

where d is a data to be quantized, and [ ] is a function that takes an integer.

Here, the image processing system 100 acquires quantization result data, for example, $Q(d_1), \ldots,$ and $Q(d_v)$, by quantizing the quantization target data, for example, $d_1, \ldots,$ and $d_v$, using a quantization function (S210). The quantization result data may be encoding target data to be encoded (by, for example, Huffman coding). When the indexing process as described above is performed, pixel values may be the quantization result data.

The values of the quantization target data $d_1, \ldots,$ and $d_v$ may be negative. Specifically, when the value of a target data, for example, $p_v$, is smaller than a predicted data, for example, $pred(p_v)$, of the target data, the value of a quantization target data, for example, $d_v$, is negative, and the value of a quantization result data, for example, $Q(d_v)$, of the quantization target data $d_v$ is negative.

At this time, in the case of lossy compression of the related art, the sign bit of the quantization result data $Q(d_v)$ must be stored. This is because, when a restoration data corresponding to the target data $p_v$ is acquired using the quantization result data $Q(d_v)$, the restoration data may not be in a normal range due to an error in quantization.

For example, a restoration data $p_v'$ restored using the quantization result data $Q(d_v)$ is expressed by Formula 2 below:

$$p_v'=pred(p_v)+Q^{-1}(Q(d_v)) \qquad \text{Formula 2,}$$

where $Q^{-1}$ is an inverse quantization function, and $pred(p_v)$ indicates a predicted data of $p_v$. The inverse quantization function $Q^{-1}(x)$ may be $x*q$.

In the case of lossy compression like this, since there is an error between the quantization target data $d_v$ and the data $Q^{-1}(Q(d_v))$ acquired by inversely quantizing the quantization result data $Q(d_v)$ obtained by quantizing the quantization target data $d_v$, there is also an error between the target data $p_v$ and the restoration data $p_v'=pred(p_v)+Q^{-1}(Q(d_v))$ corresponding to the target data $p_v$. Due to this error, the value of the restoration data $pred(p_v)+Q^{-1}(Q(d_v))$ may not be within the normal range. Therefore, in the related art, the sign bit of the quantization result data $Q(d_v)$ must also be stored.

In order to overcome this problem, the image processing system 100 according to the principle of the present invention selectively corrects each of the quantization result data $Q(d_1), \ldots,$ and $Q(d_v)$, and specifically encodes the correction data as encoding target data unlike the related art in which the quantization result data $Q(d_1), \ldots,$ and $Q(d_v)$ are directly encoded as the encoding target data. When the indexing process as above is performed, the correction data may be pixel values.

For this purpose, the image processing system 100 quantizes each of the quantization target data $d_1, \ldots,$ and $d_v$ and acquires a restoration data for each of the quantized quantization result data $Q(d_1), \ldots,$ and $Q(d_v)$ (S220).

For example, the image processing system 100 acquires a restoration data $p_v' = Q^{-1}(Q(d_v)) + pred(p_v)$ corresponding to each quantization result data $Q(d_v)$.

When the restoration data $p_v'$ is within the normal range, the quantization result data $Q(d_v)$ itself is specified as an encoding target data to be encoded.

When the restoration data $p_v'$ is not within the normal range, the value of the restoration data $p_v'$ may be smaller than 0 or greater than $2^m-1$. In this case, the image processing system 100 corrects the quantization result data $Q(d_v)$ such that the restoration data $p_v'$ beyond the normal range has a value within the normal range.

For example, when the value of the restoration data $p_v'$ is smaller than the normal range, a predetermined correction value c may be added to the quantization result data $Q(d_v)$. In addition, when the value of the restoration data $p_v'$ is greater than the normal range, the correction value c may be deducted from the quantization result data $Q(d_v)$.

The correction value c may be any value that allows the value of a restoration data, for example, $Q^{-1}(Q(d_v)-c)+pred(p_v)$ or $Q^{-1}(Q(d_v)+c)+pred(p_v)$, acquired using a correction data, for example, $Q(d_v)-c$ or $Q(d_v)+c$, based on the correction value c to be within the normal range.

In an example, the smaller the correction value c is, the more similar the data restored using the correction data $Q(d_v)-c$ or $Q(d_v)+c$ is to the data restored using the original quantization result value $Q(d_v)$.

Therefore, when the quantization function as in Formula 1 is used, the error range may be q/2. Even in the case in which the correction value c is selected to be 1, the data restored using the correction data may be corrected such that the value thereof belongs within the normal range. The correction value c may be selected to depend on the quantization function.

This process can be expressed by the formulas illustrated in FIG. 9.

The image processing system 100 acquires the quantization result data $Q(d_1), \ldots,$ and $Q(d_v)$ by quantizing quantization target data, for example, the differential values $d_1, \ldots,$ and $d_v$ of the original image (S210).

Then, the image processing system 100 acquires the restoration data $p_v'$ corresponding to each of the acquired quantization result data $Q(d_1), \ldots,$ and $Q(d_v)$ (S220).

Afterwards, the image processing system 100 selectively corrects the quantization result data $Q(d_1), \ldots,$ and $Q(d_v)$ according to whether or not the value of each restoration data $p_v'$ is within the normal range (S230, S240, S250).

The selective correction of the quantization result data $Q(d_1), \ldots,$ and $Q(d_v)$ may be expressed by Formula 3 below:

$$Cal(Q(d_v)) = \begin{cases} Q(d_v) & (\text{if } 0 \leq Q^{-1}Q(d_v) + pred(p_v) \leq 2^m - 1) \\ Q(d_v) - c & (\text{if } Q^{-1}Q(d_v) + pred(p_v) > 2^m - 1) \\ Q(d_v) + c & (\text{if } Q^{-1}Q(d_v) + pred(p_v) < 0) \end{cases} \quad \text{Formula 3}$$

where m indicates the number of bits (e.g. 8 bits) expressing each target data, and Cal( ) indicates a correction function with which a correction data is calculated. Although the correction value c may be 1 as described above, this is not intended to be limiting.

Consequently, when the restoration data of each of the quantization result data $Q(d_1), \ldots,$ and $Q(d_v)$ is not within the normal range, the image processing system 100 corrects each of the quantization result data $Q(d_1), \ldots,$ and $Q(d_v)$ and specifies the correction data as encoding target data, for example, $Cal\{Q(d_1)\}, \ldots,$ and $Cal\{Q(d_v)\}$, to be encoded. The encoding target data may be pixel value corresponding to pixel on processing target image, as mentioned above. The encoding target data may be target of indexing process as mentioned above.

Each of the specified encoding target data $Cal\{Q(d_1)\}$, and $Cal\{Q(d_v)\}$ is stored in a storage device included in the image processing system 100 (S240, S250).

When restoration data are created using encoding target data $Cal\{Q(d_1)\}, \ldots,$ and $Cal\{Q(d_v)\}$ which are corrected, the value of each created restoration data is always within the normal range. The image processing system 100 may not stored the sign bit of the encoding target data $Cal\{Q(d_1)\}, \ldots,$ and $Cal\{Q(d_v)\}$.

In addition, when the image processing system 100 according to an embodiment of the present invention encodes an image or a video frame, the target data $p_1$ to $p_v$ may be the data corresponding to the pixels. The image quality is not significantly lowered even in the case in which at least one value, for example, $Q(d_v)$, from among the above-described quantization result data $Q(d_1), \ldots,$ and $Q(d_v)$ is selectively substituted by the correction data. In contrast, the compression ratio can be significantly increased since the sign bit is not stored.

The image processing system 100 can encode the stored encoding target data $Cal\{Q(d_1)\}, \ldots,$ and $Cal\{Q(d_v)\}$ by a predetermined method. For example, variable length coding (VLC), such as Huffman coding, may be performed. However, this is not intended to be limiting. When the image indexing method is employed as described above, encoding target data can be converted into a converted image, and an image part included in the converted image can be encoded by the above-described encoding method.

The encoding system for embodying the principle of the present invention, such as the image processing system 100, includes the quantization module 160, the restoration data acquiring module 170, and the correction module 180, as illustrated in FIG. 3. The image processing system 100 may further include the pretreatment module 150 and/or an encoding module (not shown).

The quantization module 160 can acquire a quantization result data by quantizing a quantization target data. The quantization target data may be implemented as a variety of examples according to encoding solutions, for example, JPEG and H.264, and may vary according to encoding solutions depending on the type of a source data (or an original data) to be encoded. For example, when the source data is an image (or a frame of a video), a predetermined transform (e.g. discrete cosine transform (DCT)) may be performed or not according to encoding methods. Accordingly, the target data may correspond to each of pixels or each of macro-blocks. In addition, the quantization target data may be implemented as a variety of examples according to the type of the source data to be encoded or the type of the encoding solution to be used.

The restoration data acquiring module 170 can acquire a restoration data of the quantization result data. For this purpose, restoration data acquiring module 170 may include an inverse quantization module (not shown). The restoration data acquiring module 170 can inversely quantize the quantization result data, and can subsequently acquire the restoration data based on an inverse-quantized data and a predicted data corresponding to the inverse-quantized data. That is, a restored data corresponding to a target data can be acquired after the target data is substituted to corresponding differential value and quantized.

The correction module 180 specifies the encoding target data based on the acquired restoration data. The correction module 180 can selectively correct the quantization result data as described above.

In an example, when the acquired restoration data is not within a normal range, the correction module 180 stores the correction data obtained by correcting the quantization result data as the encoding target data in a storage device (not shown). When the restoration data is within the normal range, the correction module 180 can specify the quantization result data as the encoding target data.

When the encoding target data is specified in this manner, the encoding module (not shown) performs encoding via an encoding algorithm (e.g. VLC such as Huffman coding).

In addition, the image processing system 100 further includes the pretreatment module 150 that acquires a source data (e.g. an image) subjected to encoding or a target data acquired from the source data, acquires a difference data between the target data and a predicted data of the target data, and specifies the difference data as a quantization target data.

Specifically, the target data may refer to a significant data to be encoded by the image processing system 100. In an example, the target data may refer to the color value or the like of an image. However, this is not intended to be limiting. A person skilled in the art will appreciated that any type of a set of data can be encoded according to the principle of the present invention, and can be set as the target data.

In addition, when the restoration data is acquired using the correction data as described above, the correction module 180 can correct the quantization result data using the correction data such that the restoration data is within the normal range. For this, the correction module 180 can create the correction data by adding or deducting a correction value to or from the quantization result data. The correction value depends on embodiments of the quantization performed by the quantization module 160, and the correction value may be 1 in the above-described embodiment.

In this case in which the quantization result data is selectively corrected by the correction module 180, the correction module 180 can store only the other bits except for the sign bit in the storage device (not shown) when the value of the encoding target data is negative. Since the sign bit is not stored, the compression ratio can be significantly improved.

The data specified as the encoding target data by the correction module 180 can be the pixel value of the processing target image. The above-described indexing process can be performed for each pixel value.

In some implementations, the image processing system 100 and/or the image restoration system 200 may include a processor and a memory that preserves a program executed by the processor. The processor may be implemented as a single core central processing unit (CPU) or a multi-core CPU. The memory may be implemented as high-speed random access memory (RAM); or may be implemented as nonvolatile memory, such as at least one magnetic disk storage device, a flash memory device or other nonvolatile solid-state memory. Access to the memory by the processor or other components may be controlled by a memory controller. When the program is executed by the processor, it enables the image processing system 100 according to an embodiment of the present invention to execute the above-described image processing method.

The image processing method and/or the image restoration method according to an embodiment of the present invention can be embodied as computer readable program commands and can be stored in a computer readable recording medium. In addition, a control program and a target program according to an embodiment of the present invention can be stored in a computer readable recording medium. The computer readable recording medium includes all sorts of recording devices that store data readable by a computer system.

The scope of the present invention is defined not by the detailed description of the present invention but by the appended claims. It should be interpreted that all changes or modifications derived from the definition and range of the appended claims as well as the equivalents thereof will fall within the scope of the present invention.

What is claimed is:

1. A system comprising:
at least one memory configured to store computer-executable instructions; and
at least one processor configured to execute the computer-executable instructions for processing image data comprising pixel values corresponding to a plurality of pixels, wherein a first pixel value corresponds to a first pixel and a second pixel value corresponds to a second pixel, each pixel value being within a predetermined range,
wherein processing of the image data comprises:
assigning predicted values to the plurality of pixels such that a first predicted value is assigned to the first pixel and a second predicted value is assigned to the second pixel;
generating difference data using the pixel values and the predicted values such that the difference data comprises a first difference between the first predicted value and the first pixel value and a second difference between the second predicted value and the second pixel value;
performing quantization for the difference data to provide quantized data comprising a first quantized value converted from the first difference and a second quantized value converted from the second difference;
performing inverse-quantization for the quantized data to provide a first inverse-quantized value for the first pixel and a second inverse-quantized value for the second pixel; and
adjusting the quantized data to provide adjusted quantized data, wherein adjusting the quantized data comprises:

adding the first predicted value to the first inverse-quantized value to generate a first restoration value for the first pixel,
determining that the first restoration value is within the predetermined range,
adding the second predicted value to the second inverse-quantized value to generate a second restoration value for the second pixel,
determining that the second restoration value is outside the predetermined range, and
adding or subtracting a predetermined value to the second quantized value to provide an adjusted second quantized value such that the adjusted quantized data comprises the first quantized value for the first pixel and the adjusted second quantized value for the second pixel.

2. The system according to claim 1, wherein the adjusted quantized data do not comprise a sign bit of the adjusted second quantized value.

3. A computer-implemented method of processing image data comprising pixel values corresponding to a plurality of pixels, wherein a first pixel value corresponds to a first pixel and a second pixel value corresponds to a second pixel, each pixel value being within a predetermined range,
wherein processing of the image data comprising:
assigning predicted values to the plurality of pixels such that a first predicted value is assigned to the first pixel and a second predicted value is assigned to the second pixel;
generating difference data using the pixel values and the predicted values such that the difference data comprises a first difference between the first predicted value and the first pixel value and a second difference between the second predicted value and the second pixel value;
performing quantization for the difference data to provide quantized data comprising a first quantized value converted from the first difference and a second quantized value converted from the second difference;
performing inverse-quantization for the quantized data to provide a first inverse-quantized value for the first pixel and a second inverse-quantized value for the second pixel; and
adjusting the quantized data to provide adjusted quantized data, wherein adjusting comprises:
adding the first predicted value to the first inverse-quantized value to generate a first restoration value for the first pixel,
determining that the first restoration value is within the predetermined range,
adding the second predicted value to the second inverse-quantized value to generate a second restoration value for the second pixel,
determining that the second restoration value is outside the predetermined range, and
adding or subtracting a predetermined value to the second quantized value to provide an adjusted second quantized value such that the adjusted quantized data comprises the first quantized value for the first pixel and the adjusted second quantized value for the second pixel.

4. The method according to claim 3, wherein the adjusted quantized data do not comprise a sign bit of the adjusted second quantized value.

5. A non-transitory computer-readable medium with computer-executable instructions stored thereon, wherein the instructions are to perform the method as claimed in claim 3.

6. The method of claim 3, wherein the predicted values are assigned based on at least part of the pixel values such that the first pixel value is assigned as the first predicted value for the first pixel.

7. The method of claim 3, wherein the second pixel is immediately next to the first pixel, wherein the predicted values are assigned based on a pixel value of at least one neighboring pixel such that the first pixel value is assigned as the second predicted value for the second pixel.

8. The method of claim 3, wherein performing quantization comprises dividing each of the first difference and the second difference by a predetermined denominator, wherein the first quantized value is a first quotient obtained by dividing the first difference by the predetermined denominator, wherein the second quantized value is a second quotient obtained by dividing the second difference by the predetermined denominator.

9. The method of claim 8, wherein performing inverse-quantization comprises multiplying the first quantized value by the predetermined denominator to provide the first inverse-quantized value for the first pixel, wherein performing inverse-quantization comprises multiplying the second quantized value by the predetermined denominator to provide the second inverse-quantized value for the second pixel.

10. The method of claim 3, wherein the predetermined value for adding or subtracting is determined such that a sum of the second predicted value and a result of inverse-quantization of the adjusted second quantized value fall within the predetermined range.

* * * * *